United States Patent [19]

Kopp

[11] Patent Number: 4,955,544
[45] Date of Patent: Sep. 11, 1990

[54] DOSAGE GUN

[75] Inventor: Volker Kopp, Esslingen, Switzerland

[73] Assignee: C. Ehrensperger AG, Erlenbach, Switzerland

[21] Appl. No.: 181,653

[22] Filed: Apr. 14, 1988

[30] Foreign Application Priority Data

Apr. 16, 1987 [CH] Switzerland .......................... 1501/87

[51] Int. Cl.$^5$ ............................................. B05B 7/12
[52] U.S. Cl. ..................... 239/304; 239/407;
239/413; 239/415; 239/417.3; 239/527;
137/898
[58] Field of Search ................ 239/61, 303, 304, 407,
239/413, 416, 414, 416.4, 416.5, 305, 415, 434.5,
526, 527, 417, 583, 417.3; 137/896, 897, 898,
637.4, 625.4; 251/149.6, 149.7

[56] References Cited

U.S. PATENT DOCUMENTS

| 1,746,180 | 2/1930 | Ainscow ........................ 239/416.4 |
| 3,027,096 | 3/1962 | Giordano ........................ 239/414 |
| 3,093,311 | 6/1963 | Morris et al. . |
| 3,135,467 | 6/1964 | Greenman ...................... 239/304 |
| 3,784,110 | 1/1974 | Brooks . |
| 4,114,853 | 9/1978 | Medvick ........................ 251/149.6 |
| 4,117,551 | 9/1978 | Brooks et al. . |
| 4,378,028 | 3/1983 | Weber et al. ................ 251/149.6 |
| 4,396,529 | 8/1983 | Price et al. . |
| 4,497,621 | 2/1985 | Kudert et al. ................ 239/562 |
| 4,655,251 | 4/1987 | Nimberger ................... 251/149.6 |

FOREIGN PATENT DOCUMENTS

| 0063707 | 11/1982 | European Pat. Off. ............ 239/527 |
| 2637341 | 2/1978 | Fed. Rep. of Germany ...... 239/416 |
| 3128611 | 1/1983 | Fed. Rep. of Germany . |
| 354408 | 6/1986 | Fed. Rep. of Germany . |
| 1330369 | 5/1963 | France ................................ 239/417 |
| 20122 | of 1911 | United Kingdom ................ 239/407 |
| 488046 | 6/1938 | United Kingdom ................ 239/414 |

Primary Examiner—Andres Kashnikow
Assistant Examiner—Christopher G. Trainor
Attorney, Agent, or Firm—Fay, Sharpe, Beall, Fagan, Minnich & McKee

[57] ABSTRACT

A dosage gun includes a housing having a longitudinal bore therein which terminates at one end in an emission nozzle and pressure tanks which hold components of the dosage material. A dosage device is held in the bore and is designed as a nozzle needle for the gun. The dosage device contains a hollow needle and a dosage needle which is arranged in the hollow needle so that co-axial streams of material, one flowing inside the other, are ejected at the emission nozzle. In relation to the hollow needle, the dosage needle is, on the one hand, movable in order to conduct the components of the dosage material to the emission nozzle and, on the other hand, rotatable in order to adjust the amounts fed to the emission nozzle. A mouthpiece is preferably provided on the emission nozzle to form a widened mixing chamber. As a static mixer, the mouthpiece contributes to good thorough mixing.

18 Claims, 3 Drawing Sheets

DOSAGE GUN

BACKGROUND OF THE INVENTION

This invention generally pertains to dosage guns. More specifically, the present invention relates to a dosage gun for producing a multi-component stream of material.

The invention is particularly applicable to a dosage gun which includes a housing that supports at least two pressure tanks, each having a valve and containing one component of the dosage material. The dosage gun discharges the components in a predetermined proportion by volume. Connection devices are arranged on the housing and connect the pressure tanks with a dosage device and with an emission nozzle on the housing. However, it will be appreciated by those skilled in the art that the invention has broader applications and may also be adapted for use in other dosage gun environments as well.

European Patent Application No. 132,457 discloses an assembly for multi-component production in which two pressure tanks, that contain the components of the material, are arranged in one frame and connected through hoses with an emission nozzle. Means are present on the frame by which the valves of the pressure tanks can be actuated. The emission nozzle is arranged in a housing in which, at the same time, shut off means are placed in order to stop the flow of material through the hoses. However, the disadvantages of this assembly include the fact that the components are fed through hoses to the emission nozzle, that the dosage takes place by a process of squeezing the hoses, that the arrangement is unwieldy and very costly to operate and that after production of the material, the parts of the set must be discarded.

Accordingly, it has been considered desirable to develop a new and improved dosage gun which would overcome the foregoing difficulties and others while providing better and more advantageous overall results.

BRIEF SUMMARY OF THE INVENTION

The problem to be solved by the invention is to provide a gun for the production of a multi-component material in which the components of the material are produced as co-axial streams flowing one inside the other and, at the same time, are mixed.

The problem is solved according to the invention by the provision of a dosage gun in which the dosage device is designed as a nozzle needle for the emission nozzle and has at least one hollow needle which is arranged in a movable fashion in relation to the emission nozzle so that the components of the material are fed along the outside periphery and through the inside, respectively, of the hollow needle. The materials are then discharged at the emission nozzle as co-axial streams which flow into each other.

In one preferred embodiment, the connection devices are arranged in a stationary manner on the housing and spaced from each other in the direction of discharge. The connection devices are so designed that the pressure tanks, which are each provided with a coupling member, are threaded into the connection devices which simultaneously open a valve on each of the pressure tanks.

One advantage of a dosage gun according to the invention is that the pressure tanks can be threaded on the gun housing with one hand and the gun is then ready for use.

It is advantageous if in a gun with a handle, the pressure tanks and the handle extend in opposing directions from the gun housing and the pressure tanks and the handle lie in the same plane. In this way, there is provided a relatively balanced gun which is especially suitable for one handed use.

In one preferred embodiment, the dosage device has a dosage needle, arranged in the hollow needle. The dosage needle can be pushed along in relation to the hollow needle in order to feed the components of the material to the emission nozzle. The dosage needle can be rotated in relation to the hollow needle to adjust the amounts fed to the emission nozzle. In this way, with the displacement of the hollow and dosage needles relative to each other, the material can be discharged in constant proportions by volume. With the rotation of the dosage needle, the proportion by volume of the material can also be varied.

By providing a mouthpiece on the emission nozzle, a widened mixing chamber can be formed. If a plastic hose is used as the mouthpiece, this advantageously provides a static mixer so that forced mixing is not necessary.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts a preferred embodiment of which will be described in detail in this specification and illustrated in the accompanying drawings which form a part hereof and wherein.

DETAILED DESCRIPTION OF THE PREFERRED EMBODIMENT

Figure 1:
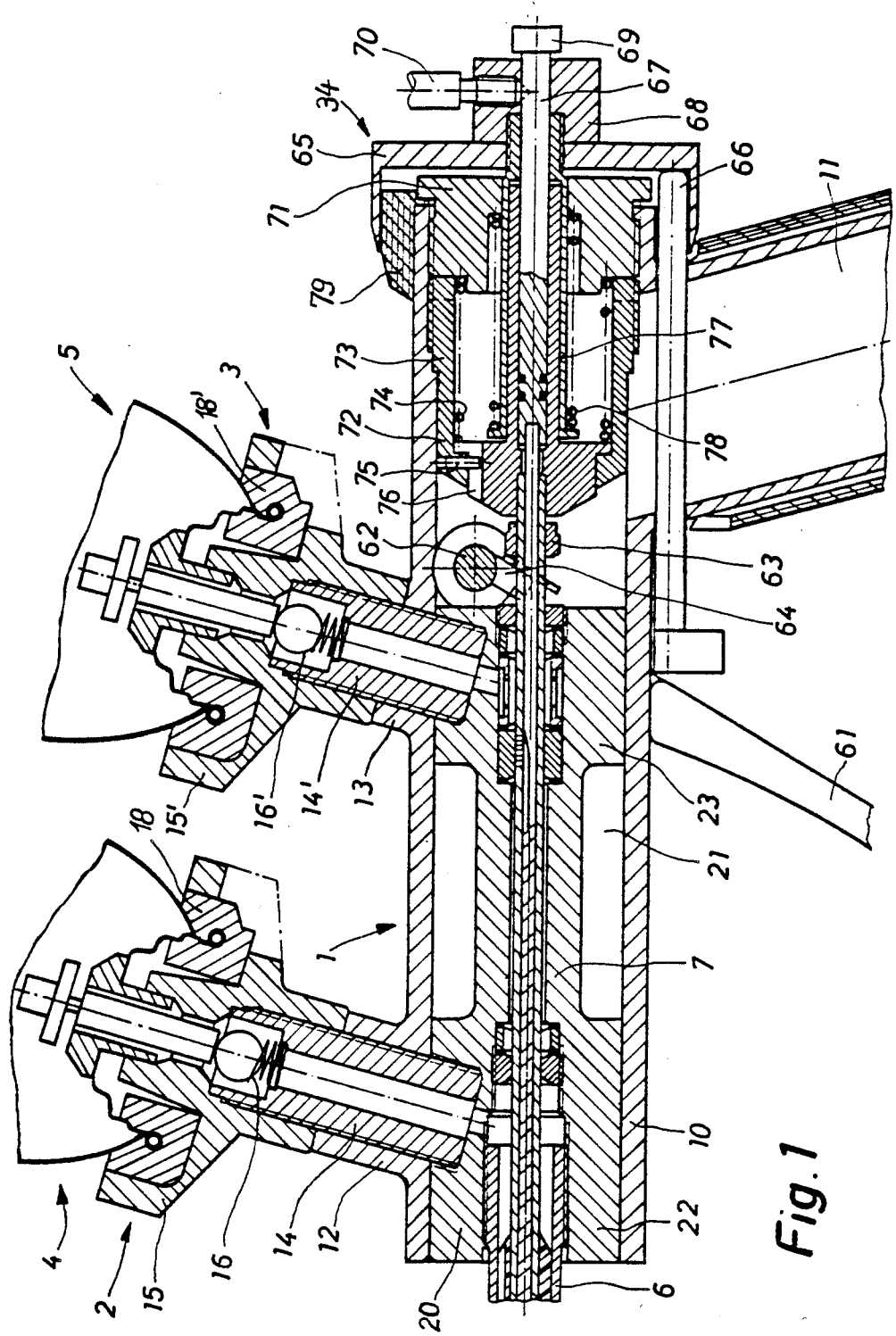
FIG. 1 shows a section through one preferred embodiment of the gun according to the present invention.

Referring now to the drawings, wherein the showings are for purposes of illustrating a preferred embodiment of the invention only and not for purposes of limiting same, FIG. 1 shows a gun for the production of a two component material, for example, polyurethane foam. The gun comprises a housing 1, in typical gun form, as well as two connection devices 2 and 3 for feeding the two components of the material and two pressure tanks 4, 5 which contain the components of the material. An emission nozzle 6 and a dosage device 7 are also provided for the gun. The dosage device delivers the components of the material in a predetermined proportion by volume to the emission nozzle.

The housing 1 of the gun has a cylindrical barrel section 10 and a handle 11 at the rear part of the section 10 when seen in the discharge direction. The handle 11 is integral with the cylindrical section 10. On the section 10 are two connection pieces 12, 13 arranged one behind the other in the discharge direction. The axes of the handle 11, the housing section 10, and the connection pieces 12 and 13 are co-planar so that the gun is balanced which makes possible a one handed operation of the gun. The connection pieces 12 and 13 are each provided with a threaded aperture into which the connection devices 2 and 3 are respectively threaded.

The connection devices 2 and 3 have the same shape but have different dimensions. As shown in FIG. 1, the connection devices 2 and 3 each comprise a respective threaded socket 14, 14', which is threaded into the connection piece 12, 13, an adaptor part 15, 15', which is threaded onto the threaded socket 14, 14', and a recoil valve 16, 16', which is mounted between the threaded socket 14, 14' and the adaptor part 15, 15' in order to prevent the entrance of air when the pressure tanks 4, 5 are removed.

The pressure tanks 4, 5 are conventional and are adapted, in the design, to the products contained therein. In the subject of the present invention, the pressure tanks 4, 5 are provided, additionally, with a coupling part 18, 18'. As shown in FIG. 1, the coupling part may be integral as a threaded ring with outer threading which is fastened on the rim of the pressure tank. Alternatively, the coupling part may be provided in several pieces which may be set on the rim as described, for example, in German disclosure document No. 3,518,627.

Figure 2:
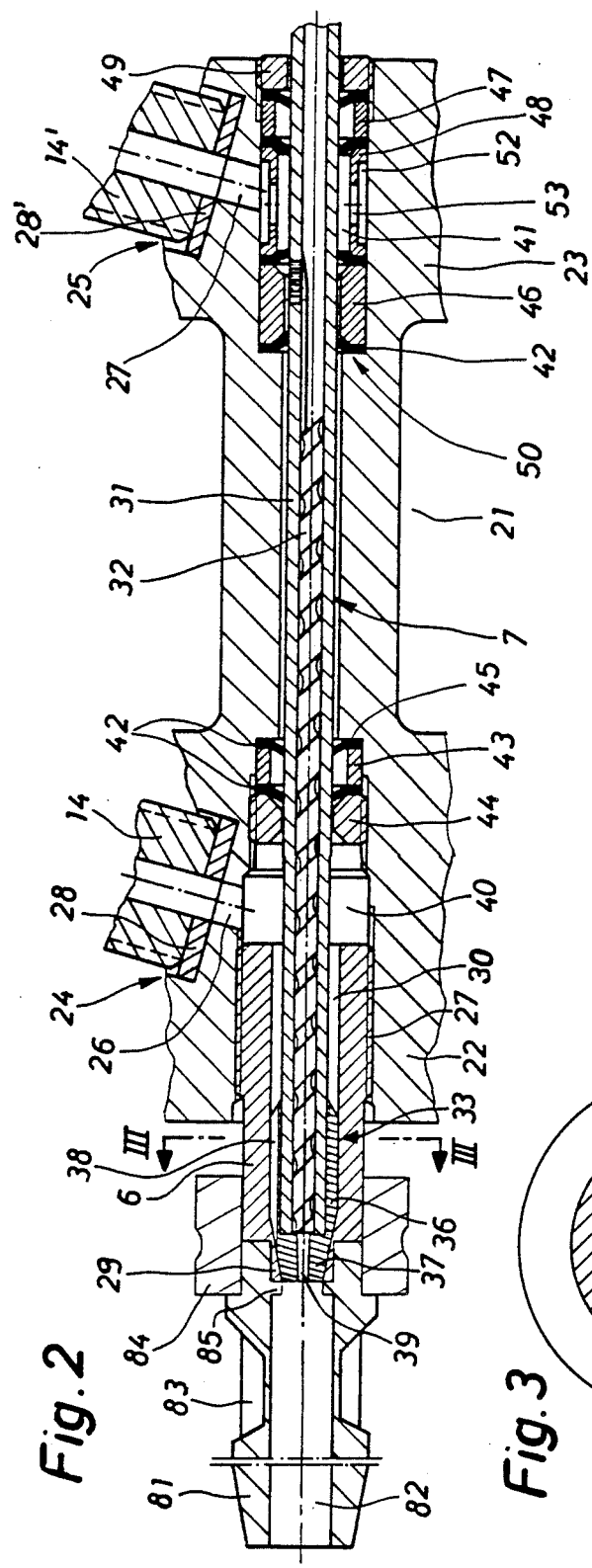
FIG. 2 is an enlarged sectional view of a barrel portion of FIG. 1.

Mounted in the housing section 10, and flush with a front edge thereof, is a generally cylindrical element 20 having two sections 22, 23 with an extension 21 therebetween. The sections 22 and 23 contact the circumference of the inner surface of the housing section 10. As is evident from FIG. 2, provided in the sections 22 and 23 is, in each case, a respective bore 24, 25 into which the threaded sockets 14, 14' of the connection device 2, 3 project. Bores 26 and 27 are also formed in the respective sections 22, 23 for the admission of the components of the material. Between the threaded sockets 14, 14' and the element 20 are arranged sealing disks 28, 28'.

As is evident from FIG. 2, the emission nozzle 6 is designed as a unitary body. The nozzle 6 is threaded at the front end of the gun into element 20 in a threaded bore which is a section of a passage hole extending through the element 20. For this purpose, the nozzle body has at one end an outer threading which can engage the threaded bore. At the other end, an added piece 29 is formed which represents the mouth. The nozzle body has a bore 30 with a conic section, which tapers toward the nozzle mouth and forms the first outlet opening for one component of the material. Into this bore 30 projects the dosage device 7 which besides the dosing function also performs a discharge function. In other words, the dosage device is designed as a nozzle needle.

Figure 3:
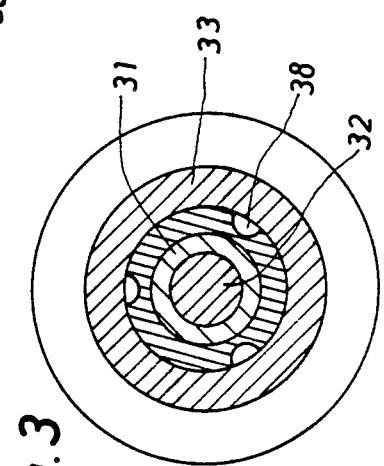
FIG. 3 is a cross-sectional view along line 3—3 of FIG. 2.

The dosage device 7 includes a hollow needle 31, a dosage needle 32, and a closing member 33. The dosage device is connected with an actuator device 34 (see FIG. 1) which will be discussed more fully hereafter. The dosage needle 32 is arranged in a movable manner within the hollow needle 31. The closing member 33 has a cylindrical section 36, the outer diameter of which is adapted to fit within the inner diameter of the bore 30 in the nozzle body, and a conic section 37 which is adapted to fit within the conic section of the bore 30 and the nozzle body. As is evident from FIG. 3, grooves 38 are formed at the circumference of the cylindrical section 36 of the closing part 33. In the conic section 37 of the closing part 33, a conic bore is formed which tapers toward the mouth and forms a second outlet opening for the other component of the material. Into this conic bore projects a section 39 formed at the end of the dosage needle 32.

To assure an adequate seal between the nozzle body 6 and the closing member or part 33 and between the dosage needle 32 and the closing part 33, the closing part is advantageously made of an elastically deformable material, such as plastic. However, the closing part 33 may be made of a rigid material such as metal, ceramic or the like if desired.

First and second chambers 40, 41 are provided in the element 20 in the zone of the respective inlet bores 26, 27 in the housing 10 so that the particular components of the material can flow into these chambers. The first chamber 40 is determined, on the one hand, by the nozzle body 6 and on the other hand by a sealing arrangement. The sealing arrangement consists of a pair of lip seals 42 which lie against the circumference of the hollow needle 31 and are separated from each other by a distancing socket 43. This arrangement is held in place by a threaded ring 44 against a first shoulder 45 formed in the passage bore of the element 20. In this arrangement, the first chamber 40 is connected through the inlet bore 26 with the connection device 2 and through the bore 30 in the nozzle body and the grooves 38 in the closing part 33 with the first outlet opening.

The second chamber 41 is also formed by a sealing arrangement, which is provided in another section of the passage bore in the element 20. The sealing arrangement comprises two groups which have, in each case, two lip seals 42 that lie against the circumference of the hollow needle 31 and a respective spacing socket 46, 47 which holds the lip seals 42 at a distance from each other. Also provided is a distancing holder 48 which is arranged between the pairs of lip seals. The sealing arrangement is pressed and held in place by a threaded ring 49 against a second shoulder 50 formed in the passage bore of the element 20. The distancing holder 48 is provided at its circumference with a ring form opening 52 and a plurality of apertures 53 so that the corresponding components of the material can flow into the chamber 41.

Figure 4:
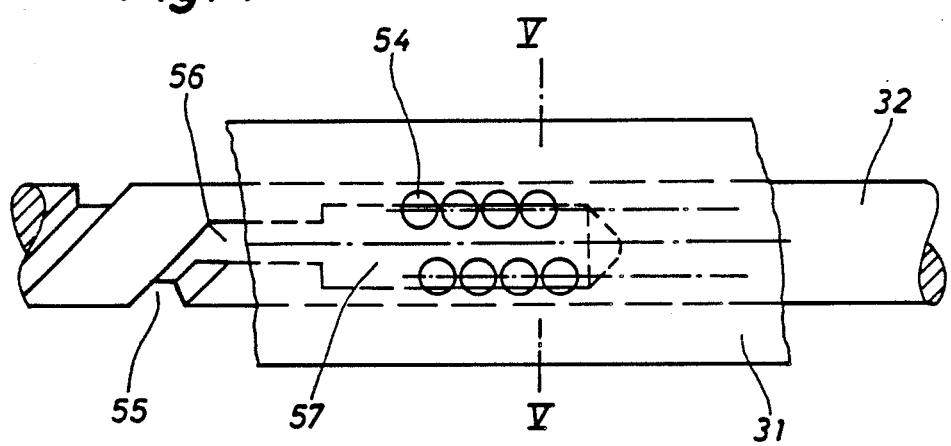
FIG. 4 is an enlarged top plan view of a section of the dosage device.
Figure 5:
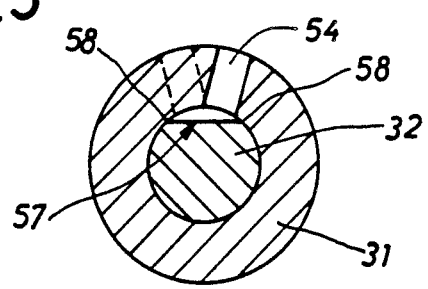
FIG. 5 is a cross-sectional view along line 5—5 of FIG. 4.

As is shown in FIGS. 4 and 5, the hollow needle 31 is provided with a plurality of radial bores 54 which can be pushed, at least partly, into the second chamber 41. The dosage needle 32 has a spiral groove 55 and to this groove is connected a straight groove 56 which extends in the axial direction and forms an inflow channel. Connected with the straight groove 56 is a flat section 57 which extends up to the bores 54 in the hollow needle when the dosage needle 32 is introduced completely into the hollow needle 31. With this arrangement, the second chamber 41 is connected through the bores 54 in the hollow needle 31 to the flat section 57 of the straight groove 56 and the spiral groove 55 with the second outlet opening. Through the flat section 57 are provided two edges 58 which are parallel with each other and are used for the control of material flow as will be explained hereafter.

The dosage needle 32 described heretofore and illustrated in FIG. 5 has only one groove 55 and one section 57. However, it would normally be advantageous for the dosage needle 32 to have two such grooves. In other words, a double spiral and two flat sections which are formed on opposing surfaces and a hollow needle 31 which has at least two sets of bores 54 formed on a line running through the center opposite each other would be advantageous.

The actuation device 34 of the gun has a trigger 61 arranged adjacent the handle. The trigger 61 is connected to a shaft 62 that is supported in the housing section 10. The actuation device 34 also includes a setting ring 63 which is arranged on the hollow needle 31 and a cam 64 which is fastened to the shaft 62 and lies against the setting ring 63 to pull back the hollow needle 31 when the cam 64 is swung, together with the trigger 61, in the direction of the handle 11. Also included is a cap 65 which is connected to the dosage needle 32 and a setting pin 66 which lies, on the one hand, against the trigger 61, and on the other hand, against the inside of the cap 65 to draw back the dosage needle 32 when the trigger 61 is swung in the direction of the handle 11.

To the end of the dosage needle 32 is fastened an extension part 67, which extends through the cap 65, and a setting ring 68, and is provided with a handle part 69 with which the dosage needle 32 can be actuated manually. The dosage needle 32 is connected with the cap 65 through a set screw 70 which is provided on the setting ring 68. The setting pin 66 extends through the handle 11 outside the housing section 10. As is apparent from FIGURE the shaft 62 is supported in the housing section 10 so that the turning point for the cam 64 and the trigger 61 lies above the axis of the housing section 10 and above the hollow needle 31.

There are thus given, starting from the turning point, different distances to the point of contact of the setting ring 63 and the cam 64 and of the trigger 61 and the setting pin 66. In this way, different lengths of movement are provided for the hollow needle 31 and the dosage needle 32. In the embodiment described above, the lengths of movement for the hollow needle and for the dosage needle are in the ratio of approximately 1 to 3.

A set back mechanism is provided for the hollow needle 31 and the dosage needle 32 which presses the two needles into a rest position in which the outlet openings on the nozzle body 6 or on the closing part 33 are closed. Into the rear of the housing section 10 is threaded a stopper 71 which closes off the housing section 10 at the same time. The set back mechanism for the hollow needle 31 includes a guide part 72, which is fastened to the end of the hollow needle 31 and is arranged movably on the extension part 67 of the dosage needle 32. Also provided is a holding bushing 73 for the guide part 72 that is threaded into the housing section 10 and a set back spring 74 which is designed as a compression spring and is arranged between the guide part 72 and the threaded stopper 71. In the holding bushing 73 is provided a pin 75 which engages in a slot 76 on the guide part 72 to secure the guide part against twisting.

The set back mechanism for the dosage needle 32 includes a guide element 77 which leads into the threaded stopper 71 and is connected with the cap 65, and a set back spring 78 which is designed as a compression spring and is arranged between the guide element 77 and the threaded stopper 71. A scale 79 is arranged on the rear end of the housing 10.

As shown in FIG. 2, positioned on the added part 37 of the emission nozzle 6 is a mouthpiece 81 that is secured by a support ring 84 arranged on the emission nozzle. The mouthpiece 81 has a bore 82 which forms a widened mixing chamber and is limited by a ring form projection 85. The ring form projection also provides a shoulder which serves as a stop in securing the mouthpiece part 81 on the nozzle 6. In the mouthpiece 81 are provided a plurality of notches 83 which serve as an intentional breaking point at which the mouthpiece can be broken off if the mouthpiece becomes stopped up. Also prevented, advantageously, is a situation where in the case of an error in operation or a defect, the component of the material which is fed through the first chamber 40 when the emission nozzle 6 is open might be pressed into the second chamber 41 so that the material would become hardened.

Figure 6:
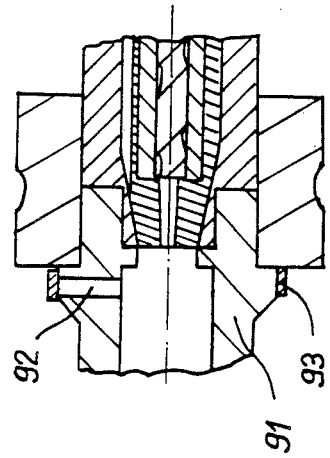
FIG. 6 is a sectional view of an alternate embodiment of a mouthpiece in the set in condition.

Referring now to the embodiment disclosed in FIG. 6, the mouthpiece 91 there shown has essentially the same form as the mouthpiece 81 in FIG. 2. However, it differs by the fact that a bore 92 extends radially through the wall near the connection zone of the mouthpiece and that a ring form element 93 of elastic material is arranged on the circumference of the mouthpiece 91. This is done to seal the bore 92 on its outer periphery. The elastic element 93 serves as a pressure equalizing valve for the mouthpiece.

To produce a two component material with the gun described hereinabove, the pressure tanks 4, 5 which contain the component parts of the material are threaded into the connection devices 2, 3 on the gun as it is held in one hand with the tanks being threaded into the gun with the other hand. In this way, the one component flows through the one connection device 2 with the recoil valve opened, the inlet opening 26 into the first chamber 40 and from there into the bore 30 and the groove 38. The other component flows through the other connection device 3 with the recoil valve opened, through the inlet bore 27 and the bores in the distance holder into the second chamber 41. With this, the gun is ready for production.

Production is initiated by pulling the trigger 61 in the direction of the handle 11. With the swinging motion of the trigger, the hollow needle 31 and the dosage needle 32 are pushed along at the same time against the action of the first and second set back mechanisms. Through the different distances between the turning point of the trigger and the release points for the pushing along of the hollow needle and of the dosage needle, the length of displacement is shorter for the hollow needle than for the dosage needle. Through the displacement of the hollow needle, the conic section of the closing part 33 is drawn out of the nozzle body 6 and the bores 54 in the hollow needle 31 are introduced into the second chamber 41. With this, the other component of the material flows into the spiral groove 55 of the dosage needle 32, up to the conic section of the closing part. Through the proportionately longer displacement of the dosage needle 32, it is assured that the two components of the material will exit the first and second outlet openings at about the same time. The mixing of the two components of the material is effected through the co-axial arrangement of the first and second outlet openings and the flow of the streams, one inside the other, is effected in this way. The material flowing out of emission nozzle 6 flows into the mouthpiece 81, in which a fine thorough mixing of the components takes place.

The production is interrupted when the trigger 61 is released. With this, the hollow needle 31 and the dosage needle 32 are pushed in the direction of the emission nozzle by the first and second set back mechanisms so that the conic section of the closing part 33 lies in the conic section of the bore of the nozzle body 6 and the conic added part 39 of the dosage needle 32 lies in the conic bore of the closing part and the first and second outlet openings are closed. Since the closing part 33 is made of an elastically deformable material, through the conic added part of the dosage needle, the conic section of the closing part is additionally pressed against the conic section of the bore of the nozzle body by which sealing is improved in an especially advantageous way.

If the pressure tanks are empty, these are threaded out of the connection devices. The recoil valves then shut off the inlet channels. In this way, the pressure tanks can be removed from the gun without harmful environmental contamination of the material inside the spray gun.

The proportion by volume, between the two components may be varied by rotating the dosage needle 32 in relation to the hollow needle 31. In this way, by means of edges formed by the flat sections 58 against the dosage needle 32, the inner diameter of the bores in the hollow needle 31, that is, the passage openings for the components, are varied.

A cleaning of the gun, that is of the hollow needle 31, can be done in a simple manner by drawing the dosage needle 32 backwardly out of the gun so as to be able to remove in an advantageous way the material which has flowed back from the mouthpiece. After the dosage needle is cleaned, it can be introduced again, By threading in new pressure tanks, the gun is again made ready for production.

In the embodiment described, the release of the displacement of the hollow and dosage needles take place simultaneously. However, it should be appreciated that through the design of the hollow needle and the setting ring, and of the setting pin, the release of the displacement for the hollow and dosage needle may take place also with a time retardation factor if desired.

The invention has been described with reference to a preferred embodiment. Obviously modifications and alterations will occur to others upon a reading and understanding of this specification. It is intended to include all such modifications and alterations insofar as they come within the scope of the appended claims or the equivalents thereof.

Figure 7:
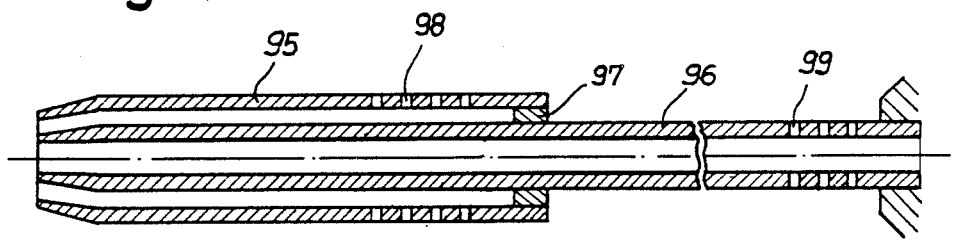
FIG. 7 is a sectional view of an other embodiment of the dosing device.

FIG. 7 shows another embodiment of a dosage device comprising two hollow needles 95,96. These hollows needles 95,96 are fixedly connected to each other by means of a connetion member 97. Each needle includes a number of holes 98, 99 extending radially the shell of the needle. These holes 98,99 form supply openings for the components of the material. The dosage device is mounted on a holding bushing 100 like that shown in FIG. 1.

What is claimed is:

1. A dosage gun for producing a multi-component material, comprising:
   a housing having a longitudinal bore therein which terminates at one end in an emission nozzle;
   at least two pressure tanks, each containing one component of the multi-component material, each tank being selectively connectable to said housing, wherein each tank has a discharge valve for selectively discharging its component into said housing longitudinal bore; and,
   a dosage device held in said housing longitudinal bore for dispensing the components in a predetermined proportion by volume, said dosage device comprising at least one hollow needle which is movably mounted in relation to said emission nozzle so that the components of the material are fed along an exterior periphery and through an interior bore, respectively, of said at least one hollow needle and wherein the components are dispensed at said emission nozzle as co-axial streams which flow into each other wherein said dosage device comprises two hollow needles which are permanently joined together so that they feed the components of the material in each case to an interior periphery of said hollow needle adjacent said emission nozzle.

2. The gun of claim 1 further comprising connection devices, which are arranged in a stationary manner on said housing and spaced from each other in the direction of discharge, for connecting said at least two pressure tanks to aid housing, wherein said connection devices are so designed that said at least two pressure tanks, which are each provided with a respective coupling part, are threaded into said connection devices simultaneously with an opening of said discharge valve on each of said tanks.

3. A dosage gun for producing a multi-component material, comprising:
   a housing having a longitudinal bore therein which terminates at one end in an emission nozzle;
   means for selectively discharging components of the multi-component material into said housing longitudinal bore;
   a dosage device held in said housing longitudinal bore for dispensing the components in a predetermined proportion by volume through said emission nozzle, said dosage device comprising:
      at least one hollow needle which is movably mounted in relation to said emission nozzle so that the components of the material are fed along an exterior periphery and through an interior bore, respectively, of said at least one hollow needle and wherein the components are dispensed at said emission nozzle as co-axial streams which flow into each other;
      a dosage needle arranged within said hollow needle, said dosage needle being movable in relation to said hollow needle in order to feed the components of the material to said emission nozzle, and wherein said dosage needle can be rotated in relation to said hollow needle in order to adjust the amount fed to said emission nozzle; and,
      wherein said dosage needle has at least one spiral groove which extends, starting from one end, over a predetermined length of the dosage needle, and forms a channel for the feeding of one component of the material, and wherein said hollow needle has at least one opening which extends radially through at least one wall of said hollow needle to feed the components of the material into the channel of the dosage needle.

4. The gun of claim 3 wherein said hollow needle is provided at one end with a closing part that lies against said emission nozzle, said closing part having a bore and wherein said dosage needle has at one end thereof an added piece which engages in said bore in said closing part.

5. The gun of claim 4 wherein said closing part includes an elastically deformable material.

6. The gun of claim 4 wherein said closing part includes a rigid material.

7. The gun of claim 3 wherein said hollow needle has several openings which are arranged in rows.

8. The gun of claim 3 wherein said dosage needle has a level section which extends lengthwise over a predetermined length of the dosage needle, wherein said dosage needle is so arranged in said hollow needle that said level section is disposed below said opening and wherein said dosage needle is rotatable in said hollow needle in order to vary, through edges formed through flat sections on the circumference of said dosage needle, the inner diameter of the opening for control of the amount of material flowing therethrough.

9. The gun of claim 3 further comprising an actuation device for moving said hollow needle and dosage needle together from a rest position into a working position and first and second reset mechanisms to reset said hollow needle and said dosage needle singly from the working position to the rest position.

10. The gun of claim 9 wherein said actuation device comprises a trigger which is rotatably arranged on said housing section and a means for converting a rotating movement of said trigger into a linear movement for said hollow and dosage needles so that upon rotation of said trigger, the linear movement of said dosage needle is greater than for said hollow needle.

11. The gun according to claim 10 wherein said means are adjustable in order to adjust the respective lengths of movement of said hollow needle and dosage needle.

12. The gun of claim 11 wherein said means are adjustable in order to move said hollow needle and dosage needle with a time delay.

13. The gun of claim 9 further comprising a scale provided on a rear end of said housing section for indicating the position of said dosage device in relation to said emission nozzle.

14. A dosage gun for producing a multi-component material, comprising:
   a housing having a longitudinal bore therein which terminates at one end in an emission nozzle;
   at least two pressure tanks, each containing one component of the multi-component material, each tank being selectively connectable to said housing, wherein each tank has a discharge valve for selectively discharging its component into said housing longitudinal bore; and,
   a dosage device held in said housing longitudinal bore for dispensing the components in a predetermined proportion by volume, said dosage device comprising at least one hollow needle which is movably mounted in relation to said emission nozzle so that the components of the material are fed along an exterior periphery and through an interior bore, respectively, of said at least one hollow needle and wherein the components are dispensed at said emission nozzle as co-axial streams which flow into each other and a dosage needle arranged within said hollow needle, said dosage needle being movable in relation to said hollow needle in order to feed the components of the material to said emission nozzle, and wherein said dosage needle is rotatable in relation to said hollow needle in order to adjust the rate of feed to said emission nozzle; and, first and second set back mechanisms which each include a spring that sets back a respective one of said hollow needle and said dosage needle into the rest position.

15. A dosage gun for producing a multi-component material, comprising:
   a housing having a longitudinal bore therein which terminates at one end in an emission nozzle;
   at least two pressure tanks, each containing one component of the multi-component material, each tank being selectively connectable to said housing, wherein each tank has a discharge valve for selectively discharging its component into said housing longitudinal bore;
   a dosage device held in said housing longitudinal bore for dispensing the components in a predetermined proportion by volume, said dosage device comprising at least one hollow needle which is movably mounted in relation to said emission nozzle so that the components of the material are fed along an exterior periphery and through an interior bore, respectively, of said at least one hollow needle and wherein the components are dispensed at said emission nozzle as co-axial streams which flow into each other and a dosage needle arranged within said hollow needle, said dosage needle being movable in relation to said hollow needle in order to feed the components of the material to said emission nozzle, and wherein said dosage needle is rotatable in relation to said hollow needle in order to adjust the rate of feed to said emission nozzle; and,
   a mouthpiece which is placed on said emission nozzle and forms a widened mixing chamber wherein said mouthpiece is provided on its circumference with notches which form an intentional break point in order to indicate a stopping up of said mouthpiece wherein said mouthpiece has at least one aperture which extends radially through a wall of said mouthpiece near a connection zone of said mouthpiece with aid emission nozzle and further comprising a ring form element of an elastic material which is arranged on a circumference of said mouthpiece to provide an exterior seal for said bore.

16. A dosage gun for dispensing a multi-component material, comprising:
   a housing having a longitudinal bore therein which terminates at one end in an emission nozzle; and,
   a dosage device held in said housing longitudinal bore for dispensing each component of a multi-component material in a predetermined proportion by volume, said dosage device comprising;
   a hollow needle which is movably mounted in relation to said emission nozzle so that separate components of the material are fed along an exterior periphery and through an interior bore, respectively, of said hollow needle and wherein the components are dispensed at said emission nozzle as co-axial streams which flow into each other, and
   a dosage needle arranged within said hollow needle, said dosage needle being movable in relation to said hollow needle in order to feed one component of the material to said emission nozzle, wherein said dosage needle comprises:
   a conveying means for moving the one component towards said emission nozzle; and,
   a measuring means for dispensing a predetermined proportion of the one component fed through said conveying means in relation to another component fed along said exterior periphery of said hollow needle, wherein said dosage needle conveying means comprises at least one spiral groove which extends, starting from one end, over a predetermined length of the dosage needle, and forms a channel for the feeding of one component of the material, and wherein said hollow needle has at least one opening which extends radially through at least one wall of said hollow needle to feed the one component of the material into the channel of the dosage needle.

17. The gun of claim 16 wherein said dosage needle measuring means comprises a level section which extends lengthwise over a predetermined length of the dosage needle, wherein said dosage needle is so arranged in said hollow needle that said level section is disposed below said opening and wherein said dosage needle is arranged rotatably in said hollow needle in order to vary, through edges formed through flat sections on the circumference for said dosage needle, the inner diameter of the opening for control of the amount of material flowing therethrough.

18. A dosage gun for dispensing a multi-component material, comprising:
- a housing having a longitudinal bore therein which terminates at one end in an emission nozzle;
- a dosage device held in said housing longitudinal bore for dispensing each component of a multi-component material in a predetermined proportion by volume, said dosage device comprising:
  - a hollow needle which is movably mounted in relation to said emission nozzle so that separate components of the material are fed along an exterior periphery and through an interior bore, respectively, of said hollow needle and wherein the components are dispensed at said emission nozzle as co-axial streams which flow into each other, and
  - a dosage needle arranged within said hollow needle, said dosage needle being movable in relation to said hollow needle in order to feed one component of the material to said emission nozzle, wherein said dosage needle comprises:
    - a conveying means for moving the one component towards said emission nozzle; and,
      - a measuring means for dispensing a predetermined proportion of the one component fed through said conveying means in relation to another component fed along said exterior periphery of said hollow needle; and,
      - a closing member encircling a front end of said hollow needle and adapted to seal against said emission nozzle to prevent a flow of another component along said exterior periphery of said hollow needle, said closing member having a longitudinal bore extending therethrough wherein an extension on a front end of said dosage needle is adapted to selectively engage in said bore, and wherein said closing member includes on its outer periphery at least one longitudinally extending groove.

* * * * *